United States Patent [19]

Newman

[11] 4,112,871
[45] Sep. 12, 1978

[54] BIRD CAGE FEEDER

[75] Inventor: Philip Newman, New Rochelle, N.Y.

[73] Assignee: New Rochelle Manufacturing Co., Inc., New Rochelle, N.Y.

[21] Appl. No.: 787,335

[22] Filed: Apr. 14, 1977

[51] Int. Cl.² ............................................. A01K 39/00
[52] U.S. Cl. ........................................ 119/18; 119/63
[58] Field of Search ....................... 119/18, 63, 17, 61, 119/51.5

[56] References Cited
U.S. PATENT DOCUMENTS

| 2,190,119 | 2/1940 | Hoefler | 119/18 X |
| 3,046,939 | 7/1962 | Vlach | 119/18 |

Primary Examiner—Hugh R. Chamblee
Attorney, Agent, or Firm—Hubbell, Cohen, Stiefel & Gross

[57] ABSTRACT

A feeder assembly of the type which mounts in the bottom of a bird cage includes a rotatable feeding member which allows a supply of bird food or water placed inside the cage to be replenished from outside of the cage.

10 Claims, 9 Drawing Figures

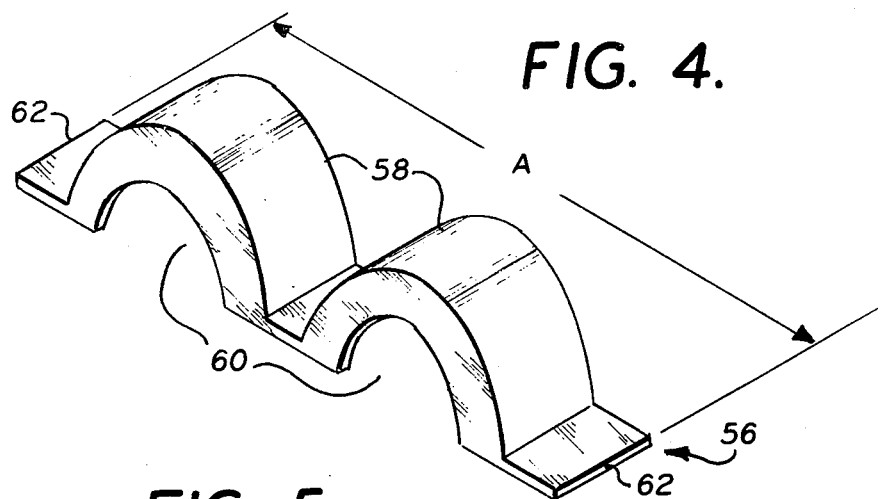
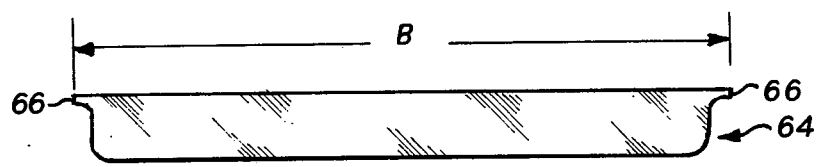
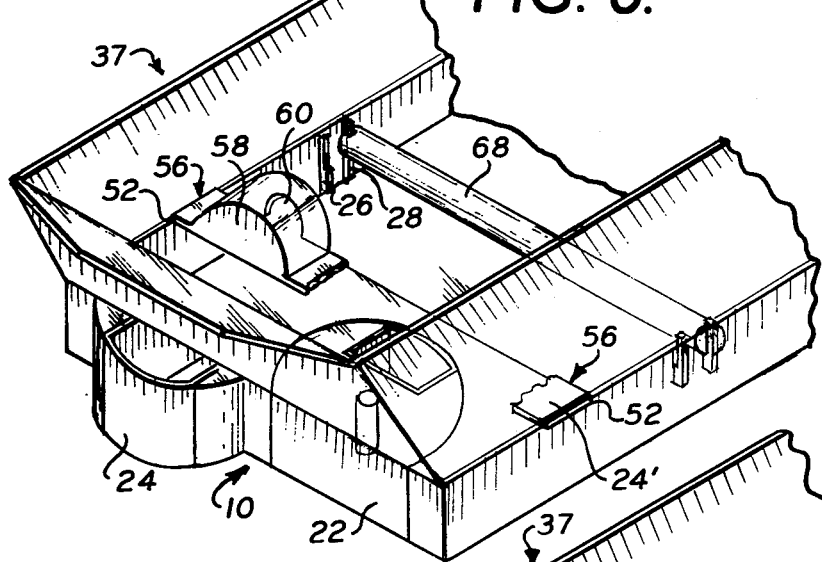
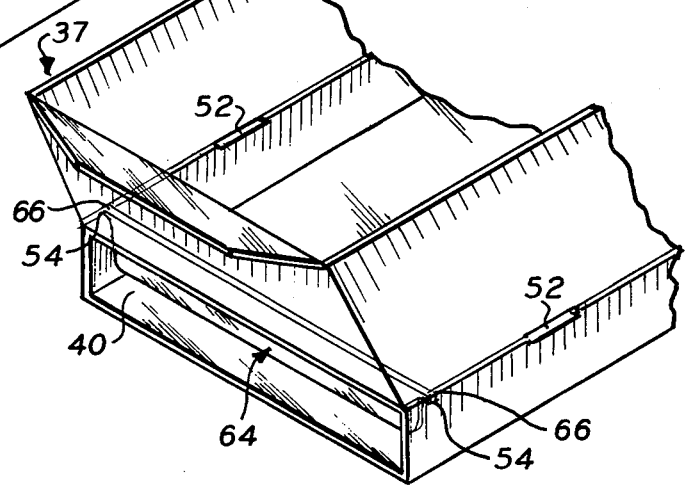

BIRD CAGE FEEDER

BACKGROUND OF THE INVENTION

1. Field of the Invention

This invention relates generally to bird feeders, and more particularly to bird feeder assemblies of the kind which are mounted in the bottom of a bird cage.

2. Description of the Prior Art

Various feeding means used in conjunction with bird cages are well known. The most simple of these includes a cup member which may be inserted directly through and fixedly held by a pair of adjacent bird cage wires. Another example consists of a cup which is insertable through an opening towards the bottom of the cage, and is retained in the opening by means of a gate or panel which slides downwardly over the opening.

A bird feeding system presently manufactured by Duett Manufacturing Company, Inc. of Long Island City, New York, includes two cup members which are insertable within respective recesses in a tray which, in turn, slides into the bottom of the bird cage. When using this system, however, it is necessary to slide the tray partly out of the cage to gain access to the cup members in order to refill them with food or water. Therefore, even though it is not necessary to have access to any portion of the tray itself to refill the cups with food or water, the tray must still be moved outwardly from the cage when it becomes necessary to replenish the supply of food or water.

The Duett feeding system also incorporates a hood member which covers the food cups while they are inside the cage to prevent bird excrement from dropping therein. When the tray is removed from the cage, the hood member swings downwardly to cover the opening through which the tray is withdrawn so that a bird cannot escape from inside the cage through the opening.

SUMMARY OF THE INVENTION

The present invention provides the convenience of including one or more feeding members within a bird cage tray, and allows the tray to remain unmoved while a supply of bird food is being replenished, by providing a feeding member arranged to be disposed with a recessed region in the tray member and which is rotatably movable within the recessed region. The feeding member includes container means for containing bird food so that the container can be rotated to a first position outside of the bird cage and to a second position inside of the cage.

The preferred embodiment of the invention also includes a stationary hood for the food containers and a separate hinged flap member which prevents a bird from exiting the cage while the tray is removed.

These and other features of the present invention will become more apparent upon a reading of the following description and drawing.

BRIEF DESCRIPTION OF THE DRAWING

FIG. 4 is a perspective view of a hood member arranged to fit towards the bottom of the base member of FIG. 3A;

FIG. 5 shown a flap member arranged to fit towards the bottom of the base member in FIG. 3A;

FIG. 6 is a detailed perspective view showing the tray of FIG. 1 slidingly engaged with the base member of FIG. 3A; and FIG. 7 shows the base member of FIG. 3A with the flap member of FIG. 5 in a closed position.

DESCRIPTION OF THE PREFERRED EMBODIMENT

Figure 1:
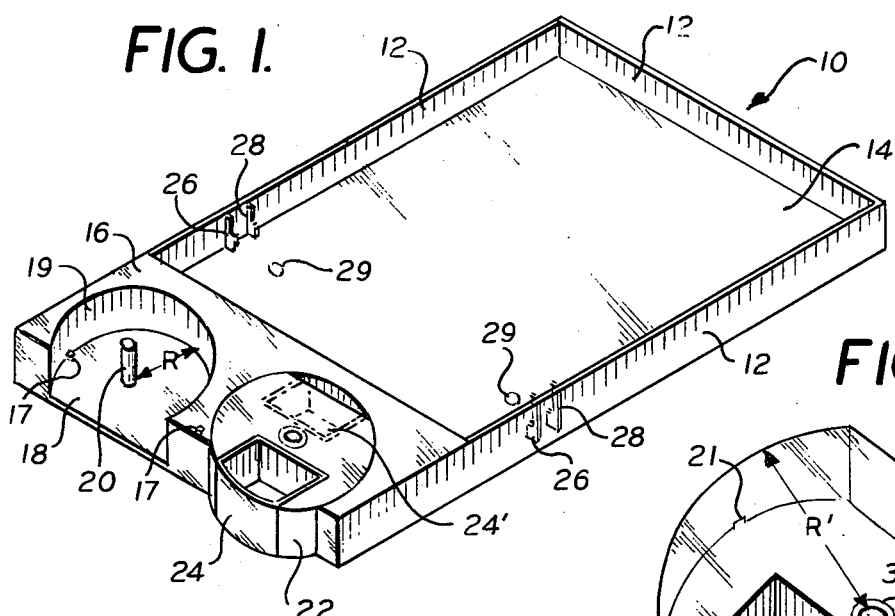
FIG. 1 is a perspective view of a bird cage tray member including a feeder assembly according to the present invention.

Referring to FIG. 1, a tray member 10 includes three side walls 12 and a raised region 16, all of which define a recessed bottom area 14. This bottom area 14 may contain, for example, sand, gravel, or gravel paper such as may ordinarily be used to line the bottom of a bird cage. The raised region 16 defines at least one recessed region 18 bounded by a wall 19 which defines a circular arc having a radius R. Centrally disposed within the recessed region 18 is a spindle member 20 which is preferably integrally formed with the tray member 10. Also located within the region 18 and adjacent the wall 19 are locating tabs 17 which are also preferably integrally formed with the tray 10. A feeding member 22 rotatably moves within the recessed region 18 when placed therein. The feeding member 22 includes container means 24 which may be detachably mounted to and rotate with the feeding member 22. Numeral 24' indicates the container means shown by dotted lines at a position diametrically opposed to that shown in dark outline in the figure. It will be apparent that the container means may be moved from the position shown by numeral 24 to that shown by numeral 24' by rotating the feeding member 22 within the recessed region 18. At each of the positions 24 and 24', the locating tabs 17 engage corresponding cutouts 21 on the feeding member which are shown in FIG. 2.

Referring still to FIG. 1, numerals 26 and 28 indicate members integrally formed with the tray member 10 for retaining a bird perch at the bottom of the tray. These members are so located as to permit a perch to be mounted a suitable distance from the container means when the container is at the position designated by numeral 24'.

Also formed preferably integrally with the tray 10 on the underside thereof are small bumps 29 which act to retain the tray after it is slid within the cage by mating with corresponding cutouts on the bottom surface of an unshown base member.

Figure 2A:
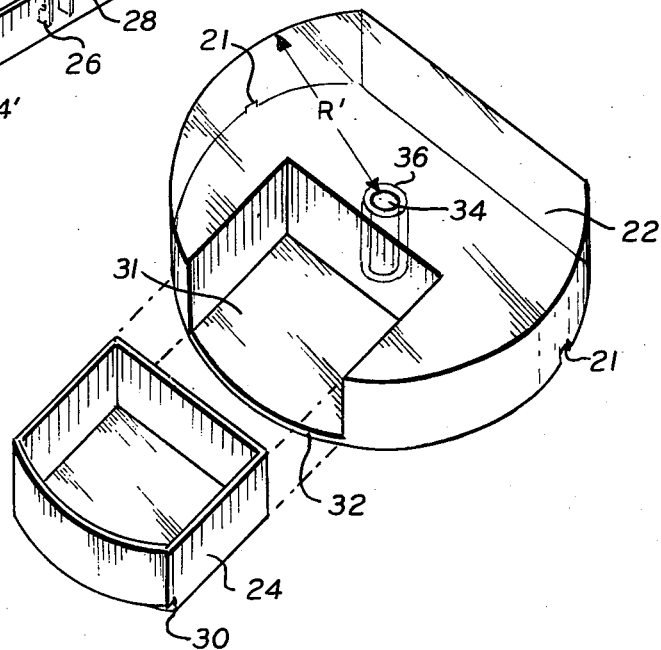
FIG. 2A is a detailed perspective view of a preferred feeding member and a bird food containing means which are mounted on the tray of FIG. 1.

FIG. 2A shows, in further detail, the feeding member 22 and container 24 of FIG. 1. In the preferred embodiment, the feeding member 22 is partially circularly shaped and has a radius R' of such length that the feeding member will smoothly rotate within the recessed region 18 of the tray 10. The member 22 defines a circular arc substantially equal to that defined by the wall 19 so that when the container 24 is at the position 24', in FIG. 1, the straight wall of the container is coplanar with the forward wall of the tray 10. This orientation of the member 22 may be seen in FIG. 6. At the center of the feeding member 22 is a hub member 36 which defines an axial bore 34 through the center of the feeding member. The hub 36 may consist of a length of tubing which is joined to the center of the feeding member 22. The opening or bore 34 is of such diameter that it smoothly accommodates the spindle member 20 shown on the tray 10 in FIG. 1. Formed at two diametrically opposed locations along the lower circular edge of the feeding member 22 are cutout regions 21 shaped to accommodate the tabs 17 when the member is at one of the two orientations 24 and 24' within the region 18 of the tray 10. Thus, the member 22 is securely held when a bird eats out of the food container 24 as well as when the container is being refilled.

The container means 24 is a cup member shaped to conform with a cutout region 31 of the feeding member 22. The lower outside edge 30 of the cup 24 has a small inwardly stepped profile to conform with the shape of a ridge 32 along the outer edge of the cutout portion 31 on the feeding member 22. It will be understood that when the cup 24 is placed within the cutout portion 31, it is retained therein by means of the ridge 32 and the stepped lower edge 30 on the cup 24. It will also be apparent that the entire feeding member 22 can be easily placed in and removed from the recessed region 18 of the tray 10 by sliding it on or off the spindle member 20.

Figure 2B:
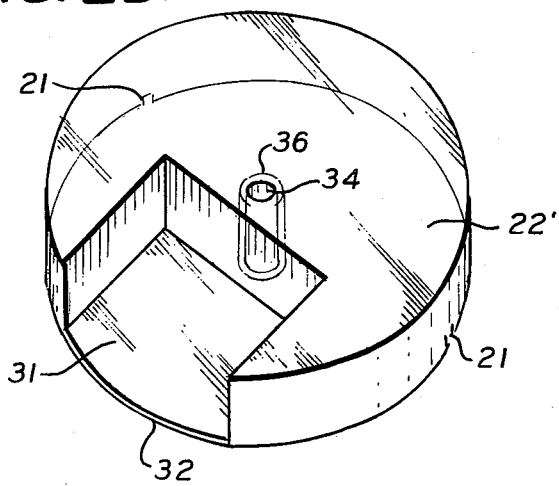
FIG. 2B is a detailed perspective view of another feeding member.

FIG. 2B shows another feeding member 22' similar to the member 22, but having a complete circular shape of radius R' rather than being segmented as is the member 22 in FIG. 2A. It will be understood that the member 22' will perform the same function as the member 22, but will partially extend from the front of the tray 10 when the container is at the position 24' in FIG. 1.

Figure 3A:
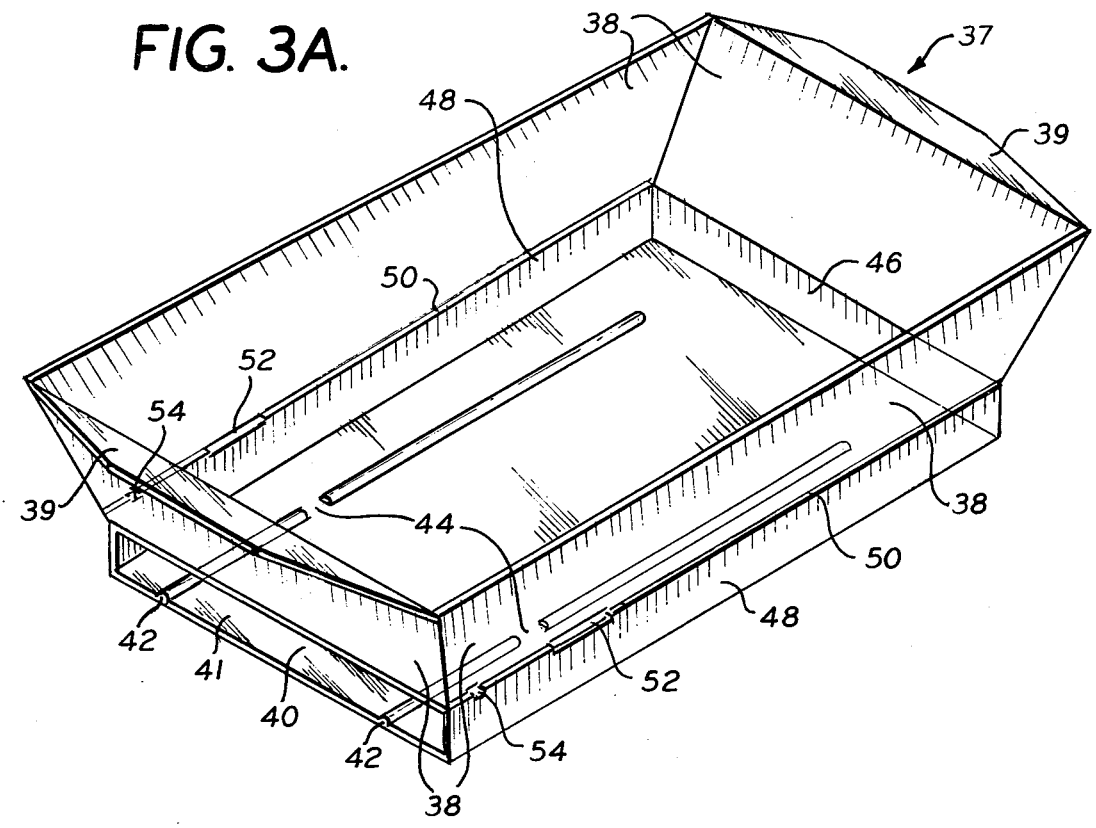
FIG. 3A is a perspective view of a base member shaped to fit about the lower portion of a bird cage and arranged to retain the tray of FIG. 1.
Figure 3B:
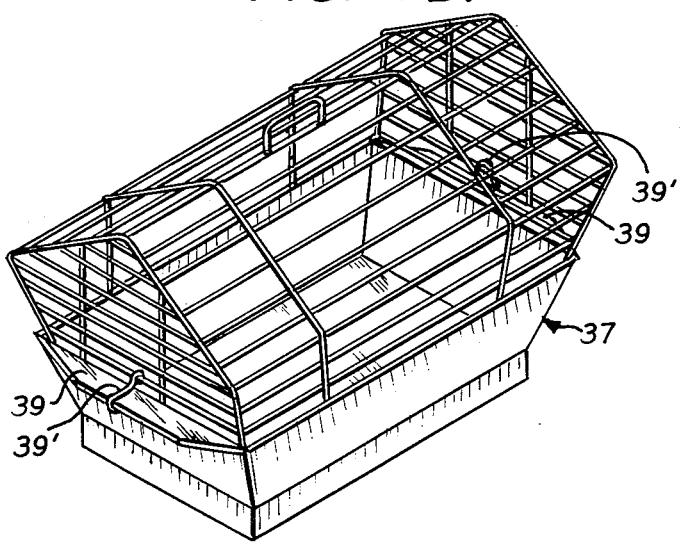
FIG. 3B is a perspective view of a bird cage having the base member of FIG. 3A mounted to its bottom portion.

While the tray 10 and feeding members 22 and 22' as shown in FIGS. 1, 2A and 2B may easily be incorporated with bird cages of the kind constructed to have sliding trays at their bottoms, the preferred embodiment of the present invention also includes a base member as shown in FIG. 3A and designated generally by numeral 37. The base member has four side walls 38 which are arranged to conform with the shape of the lower portion of a bird cage, the bottom of which is open, as shown In FIG. 3B. Located along the top edges of a pair of opposing walls 38 are outwardly extending ridge portions 39. These ridge portions 39 may engage with fastening means 39' on the bird cage in order to secure the base member 37 at the bottom of the cage. It will be understood that when the base member is so secured to the cage, the normally open bottom of the cage is closed off by the lower surface 41 of the base member 37. The lower portion of the base member 37 includes a pair of oppositely facing side walls 48 and a connecting side wall 46. An opening 40 at the bottom end of the base member 37 permits the tray member 10 of FIG. 1 to freely slide into and out of the lower portion of the base member 37. A pair of guide tracks 42, preferably integrally formed on the bottom surface 41 of the member 37 act to support the tray 10 and permit it to slide easily through the opening 40. Portions of the guide tracks are cut away at 44 so that the locating bumps 29 (FIG. 1) on the bottom of the tray will fall into the cutout regions 44 when the tray is slid in place within the member 37.

Located along the inside of a pair of oppositely facing walls 38 are horizontal ridges 50 which act to join the walls 38 with the lower side walls 48. As shown in FIG. 3A, a pair of cutout regions 52 are located on respective ridges 50, along with a pair of cutout regions 54. The purposes of these cutout regions will be explained in further detail in connection with FIGS. 4, 6 and 7.

FIG. 4 shows a hood member including a pair of integrally formed hoods 58 with cutout portions 60 sufficient to allow a bird to pass its head therethrough. The hood member, generally designated by numeral 56, is arranged to be mounted at the bottom of the base member 37 and has a length A such that the ends of the hood member 62 fall within respective cutout regions 52 on the ridges 50 toward the bottom of the base member 37.

Next, FIG. 5 shows a flap member, generally designated by numeral 64. This member has a length B such that it may be accommodated within the base member 37 by locating its pivot ends 66 within the cutout regions 54 on the ridges 50 of the base member 37.

The placement of the hood member 56 in its operative position within the base member 37 is best shown in FIG. 6. The tray member 10 and a pair of feeding members 22 are also shown in operative arrangement with the base member 37. It will be appreciated that the hood member 56 may be set to engage the cutout regions 52 in the base member 37 so that the hood protects bird feed within the cup member at 24' from bird droppings which may enter therein. A bird within the cage is free, however, to consume bird food when standing on perch 68 and placing its head through the hood opening 60.

Operation of the flap member 64 shown in FIG. 5 is best illustrated in FIG. 7. Here, it is seen that when the tray 10 is removed from base 37, the flap, pivoting in the openings 54, swings downwardly and covers the opening 40 to an extent sufficient to prevent a bird from exiting the cage through the opening 40.

Variations and modifications can, of course, be made without departing from the spirit and scope of the invention.

Having thus described my invention, what I desire to secure by Letters Patent and hereby claim is:

1. A bird feeder assembly of the type arranged to be mounted in the lower portion of a bird cage, said feeder assembly comprising:

a tray member arranged to be removably slidably mounted in said bird cage and having a recessed region located at one end thereof, the recessed region extending within the bird cage when said tray member is placed therein;

at least one container means for containing a supply of bird food;

at least one feeding member shaped to be partially disposed within said recessed region and to be rotatably movable therein, said feeding member having a portion thereof shaped to accommodate said container means, the container means being rotatable with said feeding member to a first position outisde of the bird cage, and a second position inside of the bird cage, when said tray member is inside the cage; and locking means operative to engage said feeding member so that the member becomes locked in a selected one of said first and second positions, said locking means including at least one locating tab disposed in the recessed region of the tray, said feeding member having at least one corresponding opening to accommodate said tab when at one of said first and second positions.

2. A bird feeder assembly according to claim 1, wherein said container means comprises a cup shaped to be detachably mountable within said feeding member.

3. A bird feeder assembly according to claim 1, further comprising pivot means centrally disposed within said recessed region of said tray member for pivotally engaging said feeding member so that the feeding member is fixedly mounted for rotary movement within the recessed region.

4. A bird feeder assembly according to claim 1, wherein said recessed region has a wall defining a circular arc and said feeding member is partially circularly shaped to complementarily fit within said recessed region when at said second position.

5. A bird feeder assembly of the type arranged to be mounted at the lower portion of a bird cage, said cage including means for joining the assembly thereto, said feeder assembly comprising:
- a base member shaped to accommodate the lower portion of the bird cage and including a bottom portion having an opening at one end thereof;
- a tray member arranged to removably slidably engage the bottom portion of said base member through said end opening and having a recessed region located at one end thereof, the recessed region extending inside of said base member when said tray member is placed therein;
- at least one container means for containing a supply of bird food;
- at least one feeding member shaped to be partially disposed within said recessed region and to be rotatably movable therein, said feeding member having a portion thereof shaped to accommodate said container means, the container means being rotatable with said feeding member to a first position outside of the bird cage, and a second position inside of the cage, when said tray member is inside the cage; and locking means operative to engage said feeding member so that the member becomes locked in a selected one of said first and second positions, said locking means including at least one locating tab disposed in the recessed region of the tray, said feeding member having at least one corresponding opening to accommodate said tab when at one of said first and second positions.

6. A bird feeder assembly according to claim 5, wherein said container means comprises a cup shaped to be detachably mountable within said feeding member.

7. A bird feeder assembly according to claim 5, further comprising pivot means centrally disposed within said recessed region of said tray member for pivotally engaging said feeding member so that the feeding member is fixedly mounted for rotary movement within the recessed region.

8. A bird feeder assembly according to claim 5, wherein said recessed region has a wall defining a circular arc and said feeding member is partially circularly shaped to complementarily fit within said recessed region when at said second position.

9. A bird feeder assembly according to claim 5, further comprising hood means removably mountable at the bottom of said base member and immediately above said container means for preventing bird droppings from entering said container means, said hood means having an opening sufficient to allow a bird to eat out of said container means.

10. A bird feeder assembly according to claim 5, further comprising a flap member shaped to be removably pivotably mountable at the bottom of said base member adjacent said end opening therein, and being operative to swing downwardly and cover a portion of said end opening in said base member when said tray member is removed therefrom.

* * * * *